US009000070B2

(12) United States Patent
Hogan et al.

(10) Patent No.: US 9,000,070 B2
(45) Date of Patent: Apr. 7, 2015

(54) MIXING OF TELECHELIC RUBBER FORMULATIONS

(71) Applicant: Bridgestone Corporation, Tokyo (JP)

(72) Inventors: Terrence E. Hogan, Uniontown, OH (US); Christopher Robertson, Akron, OH (US); Maria Uhall, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 165 days.

(21) Appl. No.: 13/656,116

(22) Filed: Oct. 19, 2012

(65) Prior Publication Data
US 2013/0116360 A1 May 9, 2013

Related U.S. Application Data

(60) Provisional application No. 61/548,843, filed on Oct. 19, 2011.

(51) Int. Cl.
*C08J 3/20* (2006.01)
*C08J 3/22* (2006.01)
*B60C 1/00* (2006.01)
*B29B 7/12* (2006.01)
*B29B 7/14* (2006.01)
*B29B 7/18* (2006.01)
*B29B 7/28* (2006.01)

(52) U.S. Cl.
CPC .............. *C08J 3/226* (2013.01); *B60C 1/0016* (2013.04); *C08J 3/203* (2013.01); *B29B 7/125* (2013.01); *B29B 7/14* (2013.01); *B29B 7/183* (2013.01); *B29B 7/186* (2013.01); *B29B 7/28* (2013.01)

(58) Field of Classification Search
CPC ......... C08J 3/203; C08J 3/226; B60C 1/0016; B29B 7/14; B29B 7/28; B29B 7/125; B29B 7/183; B29B 7/186
USPC ................. 523/324, 351; 524/430, 433, 445; 366/88, 97, 318, 319
See application file for complete search history.

(56) References Cited

U.S. PATENT DOCUMENTS

| 4,456,381 A | 6/1984 | Inoue et al. |
| 5,153,159 A | 10/1992 | Antkowiak et al. |
| 5,329,005 A | 7/1994 | Lawson et al. |
| 5,332,810 A | 7/1994 | Lawson et al. |
| 5,393,721 A | 2/1995 | Kitamura et al. |
| 5,491,230 A | 2/1996 | Lawson et al. |
| 5,496,940 A | 3/1996 | Lawson et al. |
| 5,520,455 A | 5/1996 | Yamada et al. |
| 5,521,309 A | 5/1996 | Antkowiak et al. |
| 5,567,815 A | 10/1996 | Hall et al. |
| 5,574,109 A | 11/1996 | Lawson et al. |
| 5,578,542 A | 11/1996 | Lawson et al. |
| 5,698,464 A | 12/1997 | Tsunoda |
| 5,786,441 A | 7/1998 | Lawson |
| 5,855,432 A | 1/1999 | Inoue et al. |
| 5,984,516 A | 11/1999 | Inoue et al. |
| 6,313,220 B1 | 11/2001 | Materne et al. |
| 6,894,103 B2 | 5/2005 | Materne et al. |
| 7,153,919 B2 | 12/2006 | Hogan et al. |
| 7,244,060 B2 | 7/2007 | Inoue et al. |
| 7,319,123 B2 | 1/2008 | Hogan et al. |
| 7,405,262 B2 | 7/2008 | Antkowiak et al. |
| 7,462,677 B2 | 12/2008 | Hogan et al. |
| 7,612,144 B2 | 11/2009 | Hogan et al. |
| 7,868,110 B2 | 1/2011 | Yan |
| 2009/0239974 A1 | 9/2009 | Mori et al. |
| 2010/0179274 A1 | 7/2010 | Jinbo et al. |
| 2010/0286348 A1 | 11/2010 | Pan et al. |
| 2011/0009583 A1 | 1/2011 | Yan et al. |
| 2011/0112263 A1 | 5/2011 | Hogan et al. |

FOREIGN PATENT DOCUMENTS

| EP | 0501227 A1 | 2/1992 |
| EP | 1110998 A1 | 6/2001 |
| EP | 1661679 A1 | 5/2006 |

OTHER PUBLICATIONS

Raj et al., "VCMT Rotors Improve Mixing Time, Throughput," Rubber & Plastics News, pp. 1-8, Feb. 24, 2003.

*Primary Examiner* — Edward Cain
(74) *Attorney, Agent, or Firm* — Meredith E. Hooker; Jenny L. Sheaffer

(57) ABSTRACT

The present disclosure is directed to methods for preparing rubber compositions where those rubber compositions comprise at least one telechelic polymer and at least one filler. The methods make use of a mixer that includes a mixing chamber and at least one rotor with wings of specified configuration. Use of the disclosed methods yields a rubber composition with improved properties including an improved dispersion index after master batch mixing as compared to the same rubber composition mixed using standard 4 wing mixers.

25 Claims, 8 Drawing Sheets

Figure 1: Mixing energy versus mixing time for the telechelic polymer.

Figure 2: Mixing energy versus mixing time for control 1 polymer.

Figure 3: Mixing energy versus mixing time for control 2 polymer.

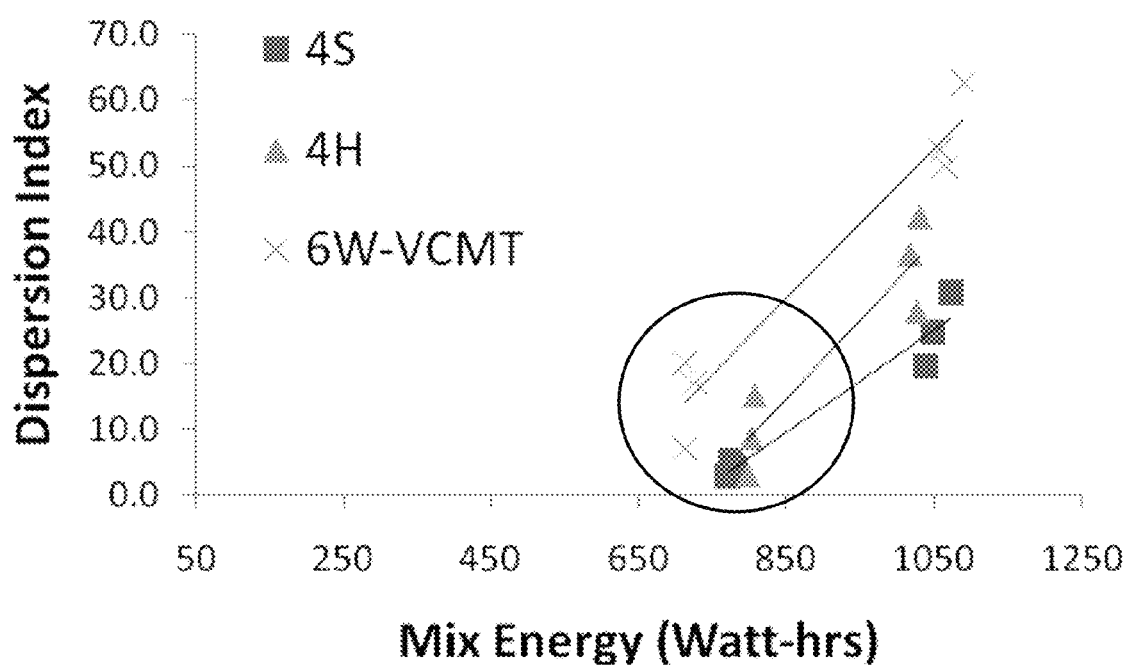
Figure 6: Dispersion index versus mixing energy for the telechelic polymer.

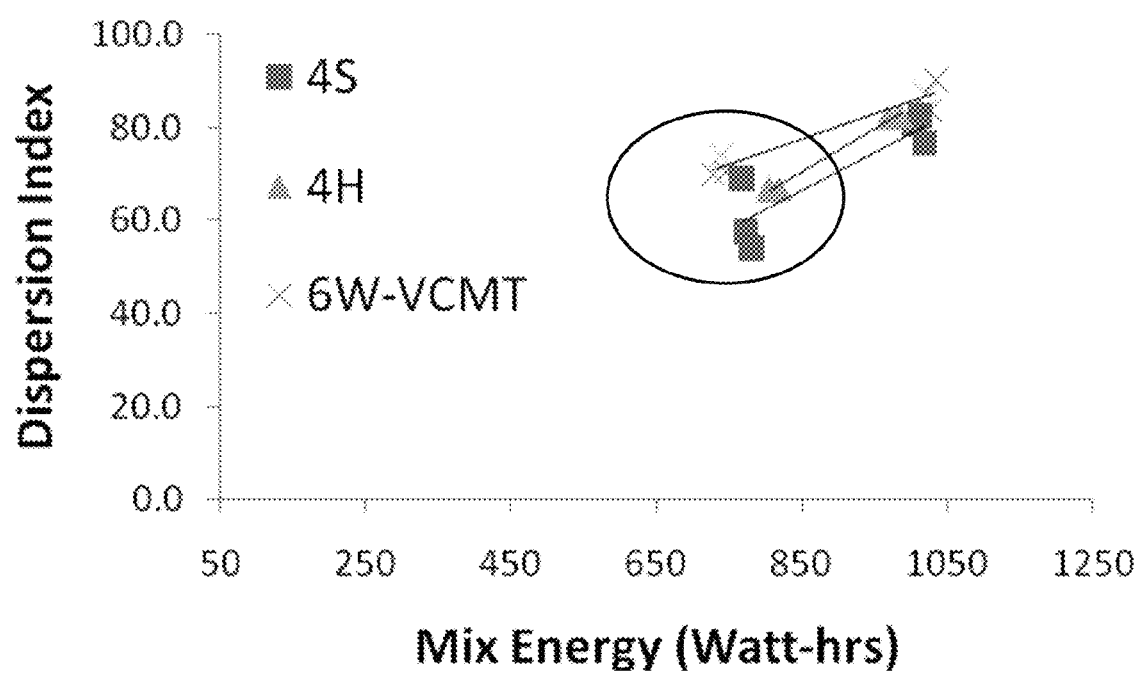
Figure 7: Dispersion index versus mixing energy for control polymer 1.

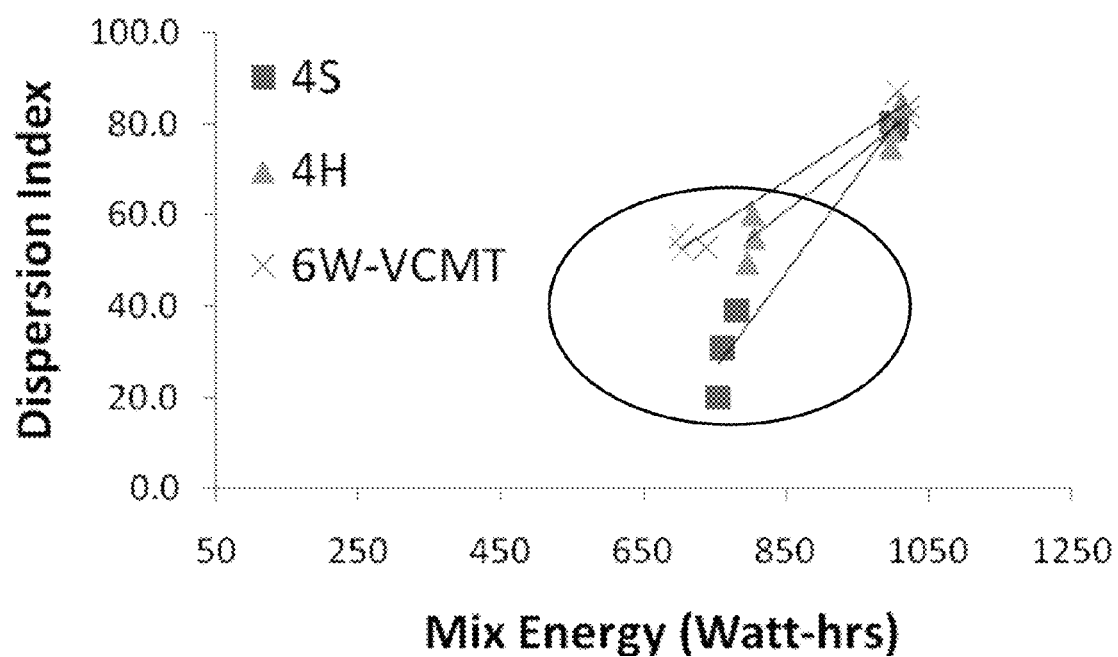
Figure 8: Dispersion index versus mixing energy for control polymer 2.

US 9,000,070 B2

MIXING OF TELECHELIC RUBBER FORMULATIONS

CROSS-REFERENCE TO RELATED APPLICATIONS

This application claims priority to and any other benefit of U.S. Provisional Patent Application Ser. No. 61/548,843 filed Oct. 19, 2011 and entitled "Mixing of Telechelic Rubber Formulations," the entire disclosure of which is incorporated by reference herein.

FIELD OF INVENTION

The present application provides methods for preparing rubber compositions where those rubber compositions comprise at least one telechelic polymer and at least one filler. The methods make use of a mixer that includes a mixing chamber and at least one rotor with wings of specified configuration. Use of the disclosed methods yields a rubber composition with improved properties including an improved dispersion index after master batch mixing as compared to the same rubber composition mixed using standard 4 wing mixers.

BACKGROUND

Rubber compositions containing ingredients such as one or more rubbery polymers or copolymers along with one or more fillers are frequently prepared using various mixing methods. Such mixing method can include the use of various mixers. The mixers include, at a minimum, some type of mixing chamber and a rotor that includes multiple wings. Mixing of the one or more rubbery polymers or copolymers may occur in various stages including a master batch stage, re-mill stage and final mixing stage. The rubbery polymers or copolymers that are utilized can include those that are functionalized such as telechelic polymers which have functionalization at both ends (i.e., the head end and the tail end).

SUMMARY OF THE INVENTION

The embodiments described herein relate to methods for preparing rubber compositions where those rubber compositions include at least one telechelic polymer and at least one filler. The methods comprise the use of a mixer that includes a mixing chamber and at least one rotor with multiple wings of specified configuration. The methods disclosed use the mixer to mix ingredients of the rubber composition in at least one stage selected from the group consisting of a master batch stage, a re-mill stage and a final mixing stage. Use of the disclosed method results in a rubber composition with improved properties including an improved dispersion index after master batch mixing that is at least 30% higher than the dispersion index of the same rubber composition (i.e., the same ingredients) mixed using a 4-wing mixer (more specifically, a 4S or 4H mixer, as discussed herein).

In one embodiment, the method includes providing a mixer with a mixing chamber and at least one rotor (with a specific wing configuration), adding to the mixer ingredients comprising at least one filler and at least one telechelic polymer having a cyclic amino alkyl functionality at its head and an $R_n MX_{4-n}$ functionality at its terminus (where R is an organic group, M is silicon or tin, X is a halogen atom and n is a numeral from 0 to 3), and using the mixer to mix the ingredients in at least one of a master batch stage, re-mill stage and final mixing stage to produce a rubber composition. The resulting rubber composition has an improved dispersion index (as measured after master batch mixing) that is at least 30% higher than the dispersion index of the same rubber composition (i.e., containing the same ingredients) mixed using a 4S or 4H mixer. As discussed in more detail later, the dispersion index is measured by using a Surfanalyzer and according to ASTM D 2663-95a, part C. The method produces an improved mixing efficiency such that the rubber composition ingredients within the mixer reach a temperature of at least 165° C. during the master batch stage at least 15% faster than the same rubber composition (i.e., containing the same ingredients) mixing using a 4S or 4H mixer. The at least one rotor of the mixer, mentioned above, includes three long wings with origins at a first end of a mixing section of the rotor and that terminate beyond a center point of the mixing section of the rotor. Each long wing has three segments, including a first segment with a first clearance to the mixing chamber, a second segment with a second clearance to the mixing chamber (different from the first clearance) and a third segment having a third clearance to the mixing chamber (different from the first clearance and from the second clearance). The at least one rotor also includes three short wings with origins at a second end of the mixing section of the rotor and that terminate before the center point of the mixing section of the rotor. The three short wings include a first short wing having the first clearance (i.e., the same clearance as for the first segment of each long wing), a second short wing having the second clearance (i.e., the same clearance as for the second segment of each long wing) and a third short wing having the third clearance (i.e., the same clearance as for the third segment of each long wing).

In another embodiment, the method includes providing a mixer having a rotor and a mixing chamber, adding to the mixer, ingredients comprising at least one filler and at least one telechelic polymer and using the mixer to mix the ingredients in at least one of a master batch stage, re-mill stage and final mixing stage to produce a rubber composition having an improved dispersion index after master batch mixing that is at least 30% higher than the dispersion index of the same rubber composition mixed using a 4S or 4H mixer. As discussed in more detail later, the dispersion index is measured by using a Surfanalyzer and according to ASTM D 2663-95a, part C. The method produces an improved mixing efficiency such that the rubber composition reaches a temperature of at least about 165° C. during the master batch at least 15% faster than the same rubber composition mixed using a 4S or 4H mixer. The rotor of the mixer has 2x wings, where x is a number between three and six, including x long wings that have origins at a first end of a mixing section of the rotor and terminate beyond a center point of the mixing section of the rotor, and further including x short wings that have origins at a second end of the mixing section of the rotor and terminate before a center point of the mixing section of the rotor. The x short wings include a first short wing having a first clearance to the mixing chamber, a second short wing having a second clearance to the mixing chamber different from the first clearance, and a third short wing having a third clearance to the mixing chamber different from the first clearance and different from the second clearance. Each of the x long wings has at least three segments, including a first segment having a fourth clearance to the mixing chamber, a second segment having a fifth clearance to the mixing chamber different from the fourth clearance, and a third segment having a sixth clearance to the mixing chamber different from the fourth clearance and different from the fifth clearance.

In yet another embodiment, the method includes providing a mixer having a rotor and a mixing chamber, adding to the mixer ingredients comprising at least one filler and at least one telechelic polymer, using the mixer to mix the ingredients in at least one of a master batch stage, a re-mill stage and final mixing stage to produce a rubber composition and incorporating the rubber composition into a tire tread, wherein the resulting tread has improved rolling resistance versus a tire tread having substantially the same pattern, made from a rubber composition of the same ingredients, mixed using a mixer having a 4 wing H rotor or a 4 wing S rotor. The rotor has 2x wings, where x is a number between three and six, including x long wings and x short wings, each of the short wings has a clearance to the mixing chamber that is different from the clearance of the other short wings, and each of the longs wings have a plurality of segments, each segment having a clearance to the mixing chamber that is different from the clearance of the other segments.

BRIEF DESCRIPTION OF THE DRAWINGS

In the accompanying drawings, structures are illustrated that, together with the detailed description provided below, describe exemplary embodiments of the claimed invention.

In the drawings and description that follows, like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 6 is a graph of dispersion index versus mixing energy for the telechelic polymer.

FIG. 7 is a graph of dispersion index versus mixing energy for control polymer 1.

FIG. 8 is a graph of dispersion index versus mixing energy for control polymer 2.

In FIGS. 1-3 and FIGS. 6-8, data points within the circle are for mixing that was discharged when the batch reached 165° C.

DETAILED DESCRIPTION

Figure 1:
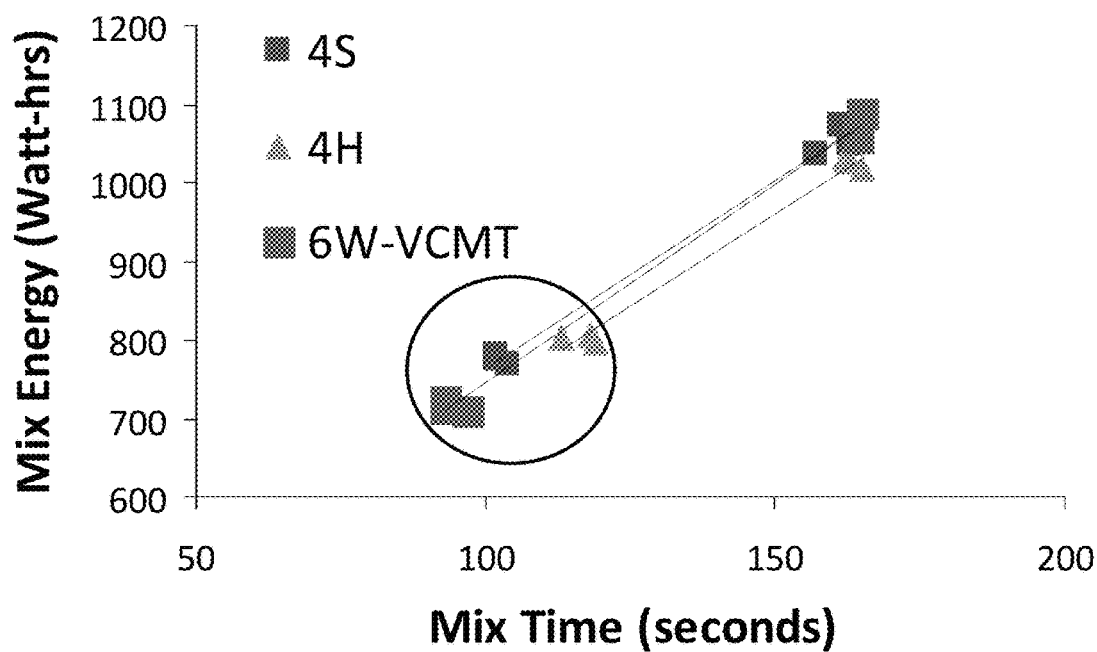
FIG. 1 is a graph of mixing energy versus mixing time for the telechelic polymer.

The present disclosure relates to methods for preparing rubber compositions (comprising at least one telechelic polymer and at least one filler) using a mixer that includes a mixing chamber and at least one rotor with wings of specified configuration to yield a rubber composition with improved properties including an improved dispersion index after master batch mixing as compared to the same rubber composition mixed using standard 4 wing mixers.

In one embodiment, the method includes providing a mixer with a mixing chamber and at least one rotor (with a specific wing configuration), adding to the mixer ingredients comprising at least one filler and at least one telechelic polymer having a cyclic amino alkyl functionality at its head and an $R_nMX_{4-n}$ functionality at its terminus (where R is an organic group, M is silicon or tin, X is a halogen atom and n is a numeral from 0 to 3), and using the mixer to mix the ingredients in at least one of a master batch stage, re-mill stage and final mixing stage to produce a rubber composition. The resulting rubber composition has an improved dispersion index (as measured after master batch mixing) that is at least 30% higher than the dispersion index of the same rubber composition (i.e., containing the same ingredients) mixed using a 4S or 4H mixer. As discussed in more detail later, the dispersion index is measured by using a Surfanalyzer and according to ASTM D 2663-95a, part C. The method produces an improved mixing efficiency such that the rubber composition ingredients within the mixer reach a temperature of at least 165° C. during the master batch stage at least 15% faster than the same rubber composition (i.e., containing the same ingredients) mixing using a 4S or 4H mixer. The at least one rotor of the mixer, mentioned above, includes three long wings with origins at a first end of a mixing section of the rotor and that terminate beyond a center point of the mixing section of the rotor. Each long wing has three segments, including a first segment with a first clearance to the mixing chamber, a second segment with a second clearance to the mixing chamber (different from the first clearance) and a third segment having a third clearance to the mixing chamber (different from the first clearance and from the second clearance). The at least one rotor also includes three short wings with origins at a second end of the mixing section of the rotor and that terminate before the center point of the mixing section of the rotor. The three short wings include a first short wing having the first clearance (i.e., the same clearance as for the first segment of each long wing), a second short wing having the second clearance (i.e., the same clearance as for the second segment of each long wing) and a third short wing having the third clearance (i.e., the same clearance as for the third segment of each long wing). In certain embodiments, the at least one rotor consists of a first rotor and a second rotor.

In another embodiment, the method includes providing a mixer having a rotor and a mixing chamber, adding to the mixer, ingredients comprising at least one filler and at least one telechelic polymer and using the mixer to mix the ingredients in at least one of a master batch stage, re-mill stage and final mixing stage to produce a rubber composition having an improved dispersion index after master batch mixing that is at least 30% higher than the dispersion index of the same rubber composition mixed using a 4S or 4H mixer. As discussed in more detail later, the dispersion index is measured by using a Surfanalyzer and according to ASTM D 2663-95a, part C. The method produces an improved mixing efficiency such that the rubber composition reaches a temperature of at least about 165° C. during the master batch at least 15% faster than the same rubber composition mixed using a 4S or 4H mixer. The rotor of the mixer has 2x wings, where x is a number between three and six, including x long wings that have origins at a first end of a mixing section of the rotor and terminate beyond a center point of the mixing section of the rotor, and further including x short wings that have origins at a second end of the mixing section of the rotor and terminate before a center point of the mixing section of the rotor. The x short wings include a first short wing having a first clearance to the mixing chamber, a second short wing having a second clearance to the mixing chamber different from the first clearance, and a third short wing having a third clearance to the mixing chamber different from the first clearance and different from the second clearance. Each of the x long wings has at least three segments, including a first segment having a fourth clearance to the mixing chamber, a second segment having a fifth clearance to the mixing chamber different from the fourth clearance, and a third segment having a sixth clearance to the mixing chamber different from the fourth clearance and different from the fifth clearance. In certain embodiments, each of the x short wings further includes a fourth short wing having a seventh clearance to the mixing chamber different from the first, second, and third clearance, and wherein the x long wings further includes a fourth segment having an eighth clearance to the mixing chamber different from the fourth, fifth and sixth clearance. In certain other embodiments, each of the x short wings further includes a fifth short wing having a ninth clearance to the mixing chamber different from the first, second, third, and seventh clearance, and wherein the x long wings further includes a fifth segment having a tenth clearance to the mixing chamber different from the fourth, fifth, sixth, and eighth clearance. In yet other embodiments, each of the x short wings further includes a sixth short wing having an eleventh clearance to the mixing chamber different from the first, second, third, seventh, and ninth clearance, and wherein the x long wings further includes a sixth segment having a twelfth clearance to the mixing chamber different from the fourth, fifth, sixth, eighth, and tenth clearance. In certain embodiments, the first clearance is equal to the fourth clearance, the second clearance is equal to the fifth clearance, and the third clearance is equal to the sixth clearance.

In other embodiments, the method includes providing a mixer having a rotor and a mixing chamber, adding to the mixer ingredients comprising at least one filler and at least one telechelic polymer, using the mixer to mix the ingredients in at least one of a master batch stage, a re-mill stage and final mixing stage to produce a rubber composition and incorporating the rubber composition into a tire tread, wherein the resulting tread has improved rolling resistance versus a tire tread having substantially the same pattern, made from a rubber composition of the same ingredients, mixed using a mixer having a 4 wing H rotor or a 4 wing S rotor. The rotor has 2x wings, where x is a number between three and six, including x long wings and x short wings, each of the short wings has a clearance to the mixing chamber that is different from the clearance of the other short wings, and each of the longs wings have a plurality of segments, each segment having a clearance to the mixing chamber that is different from the clearance of the other segments. In certain embodiments, the rubber composition, after master batch mixing but prior to incorporating into the tire tread, has an improved dispersion index after master batch mixing that is at least 30% higher than the dispersion index of the same rubber composition mixed using a 4S or 4H mixer [as measured by using a Surfanalyzer according to ASTM D 2663-95a, part C]. In other embodiments, the method produces an improved mixing efficiency such that the rubber composition reaches a temperature of at least 165° C. during the master batch stage at least 15% faster than the same rubber composition mixed using a 4S or 4H mixer. In certain embodiments, the rotor has three long wings and three short wings, the rubber composition, after master batch mixing but prior to incorporating into the tire tread, has an improved dispersion index after master batch mixing that is at least 30% higher than the dispersion index of the same rubber composition mixed using a 4S or 4H mixer [as measured by using a Surfanalyzer according to ASTM D 2663-95a, part C] and the method produces an improved mixing efficiency such that the rubber composition reaches a temperature of at least 165° C. during the master batch stage at least 15% faster than the same rubber composition mixed using a 4S or 4H mixer In certain embodiments, the telechelic polymer is a polymer or copolymer containing conjugated diene monomer and optionally vinyl aromatic monomer. Examples of the conjugated diene monomer for use in the rubbery polymer include, but are not limited to, 1,3 butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, 1,3-cyclopentanediene, 1,3-cyclohexadiene, 1,3-cycloheptadiene, and 1,3-cyclooctadiene, and derivatives thereof. Mixtures of two or more conjugated dienes may be utilized. Examples of the vinyl aromatic monomer when utilized in the rubbery polymer include, but are not limited to, styrene, α-methyl styrene, p-methylstyrene, and vinylnaphthalene. Mixtures of two or more vinyl aromatic monomers may be utilized. Non-limiting examples of suitable polymers include styrene-butadiene rubber, polybutadiene and polyisoprene. In certain embodiments the Tg of the telechelic polymer(s) is between −80 and 0° C. In other embodiments, the Tg is between −80 and −20° C. and in yet other embodiments between −80 and −30° C.

As discussed previously, the telechelic polymer(s) utilized in the methods disclosed herein have functionalization at both ends (i.e., the head end and the tail end). Methods for preparation of telechelic polymers are known to those of skill in the art. Dual functionalization of polymers is most commonly achieved by use of a functionalized initiator in combination with a functionalized terminator.

The telechelic polymer(s) may be prepared and recovered according to various suitable methods such as batch, semi-continuous, or continuous operations. The polymerization can also be carried out in a number of different polymerization reactor systems, including but not limited to bulk polymerization, vapor phase polymerization, solution polymerization, suspension polymerization and emulsion polymerization. The polymerization may be carried out using a free radical mechanism, an anionic mechanism or a cationic mechanism. All of the above polymerization methods are well known to persons skilled in the art. However, for exemplary purposes, a short description of anionic mechanisms is given.

When the telechelic polymer(s) is/are produced through anionic polymerization, as a polymerization initiator is preferably used an organic alkaline metal compound, and more preferably a lithium-containing compound. Functional initiators are typically an organolithium compounds that additionally include other functionality, often one or more nitrogen atoms (e.g., substituted aldimines, ketimines, secondary amines, etc.) optionally pre-reacted with a compound such as diisopropenyl benzene. Many functional initiators are known in the art. Exemplary ones are disclosed in U.S. Pat. Nos. 5,153,159, 5,332,810, 5,329,005, 5,578,542, 5,393,721, 5,698,464, 5,491,230, 5,521,309, 5,496,940, 5,567,815, 5,574,109, 5,786,441, 7,153,919, 7,868,110 and U.S. Patent Application Publication No. 2011-0112263, which are incorporated herein by reference.

In one or more embodiments, the functional initiator includes a lithiated thioacetal such as a lithiated dithiane. Lithiated thioacetals are known and include those described in U.S. Pat. Nos. 7,153,919, 7,319,123, 7,462,677, and 7,612,144, which are incorporated herein by reference.

In one or more embodiments, the thioacetal initiators employed can be defined by the formula

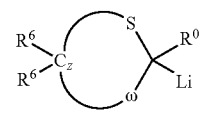

where each $R^6$ independently includes hydrogen or a monovalent organic group, $R^0$ includes a monovalent organic group, z is an integer from 1 to about 8, and ω includes sulfur, oxygen, or tertiary amino (NR, where R is an organic group).

In one or more embodiments, the functional initiators may be defined by the formula

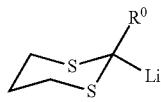

where $R^0$ includes a monovalent organic group.

Specific examples of functional initiators include 2-lithio-2-phenyl-1,3-dithiane, 2-lithio-2-(4-dimethylaminophenyl)-1,3-dithiane, and 2-lithio-2-(4-dibutylaminophenyl)-1,3-dithiane, 2-lithio-[4-(4-methylpiperazino)]phenyl-1,3-dithiane, 2-lithio-[2-(4-methylpiperazino)]phenyl-1,3-dithiane, 2-lithio-[2-morpholino]phenyl-1,3-dithiane, 2-lithio-[4-morpholin-4-yl]phenyl-1,3-dithiane, 2-lithio-[2-morpholin-4-yl-pyridine-3]-1,3-dithiane, 2-lithio-[6-morpholin-4-pyridino-3]-1,3-dithiane, 2-lithio-[4-methyl-3,4-dihydro-2H-1,4-benzoxazine-7]-1,3-dithiane, and mixtures thereof.

The amount of initiator required to effect the desired polymerization can be varied over a wide range depending upon a number of factors, such as the desired polymer molecular weight and the desired physical properties for the polymer produced. In general, the amount of initiator utilized can vary from as little as 0.1 millimoles (mM) of lithium per 100 grams of monomers up to 100 mM of lithium per 100 grams of monomers, depending upon the desired polymer molecular weight.

Many functional terminators or terminating agents useful in preparing the telechelic polymers used in the methods disclosed herein are known in the art. Exemplary functional terminators are disclosed in U.S. Pat. Nos. 3,109,871, 3,135,716, 5,332,810, 5,109,907, 5,210,145, 5,227,431, 5,329,005, 5,935,893, 4,519,431, 4,540,744, 4,603,722, 5,248,722, 5,349,024, 5,502,129, 5,877,336, 5,786,441, 5,916,976 5,552,473, 5,916,976 5,552,473, 4,677,165, 5,219,942, 5,902,856, 4,616,069, 4,929,679, 5,115,035, 6,359,167, 6,596,798, 7,598,322, International Publication No. WO 2004/020475, U.S. Ser. Nos. 60/624,347 and 60/643,653, and U.S. Patent Application Publication Nos. 2006-0178467 and 207-0149744 which are incorporated herein by reference.

The amount of terminating agent required to effect the desired termination of the polymerization can be varied over a wide range depending upon a number of factors, such as the desired polymer molecular weight and the desired physical properties for the polymer produced. In general, the amount of terminating agent utilized can vary from a molar ratio of 0.1:5 to 0.5:1.5 to 0.8:1.2 (terminating agent:Li).

The method for producing the telechelic polymer(s) through the anionic polymerization using as the polymerization initiator the organic alkaline metal compound or the like is not particularly limited. For example, the telechelic polymer(s) can be produced by polymerizing the conjugated diene monomer alone or a mixture of the conjugated diene monomer and aromatic vinyl compound in a hydrocarbon solvent inactive to the polymerization reaction. Non-limiting examples of the hydrocarbon solvent inactive to the polymerization reaction include propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on. They may be used alone or in a combination of two or more.

The anionic polymerization may be carried out in the presence of a randomizer. The randomizer can control the microstructure of the conjugated diene compound, and has an action that increases 1,2-bond content in butadiene unit of the polymer using, for example, butadiene as a monomer is controlled, and butadiene unit and styrene unit in the copolymer using butadiene and styrene as a monomer are randomized, or the like. Non-limiting examples of the randomizer include dimethoxybenzene, tetrahydrofuran, dimethoxyethane, diethylene glycol dibutyl ether, diethylene glycol dimethyl ether, bis tetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.01 to 100 molar equivalents per 1 mol of the organic alkaline metal compound as a polymerization initiator.

The anionic polymerization may be carried out through any of solution polymerization, vapor phase polymerization and bulk polymerization. In the solution polymerization, the concentration of the monomer in the solution is preferably within a range of 5 to 50% by mass, more preferably 10 to 30% by mass. When conjugated diene monomer and vinyl aromatic monomer are used together, the content of vinyl aromatic monomer in the mixture is preferably within a range of 3 to 50% by mass, more preferably 4 to 45% by mass. Also, the polymerization system is not particularly limited and may be a batch system or a continuous system.

The polymerization temperature in the anionic polymerization is preferably within a range of 0 to 150° C., more preferably 20 to 130° C. Also, such a polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as monomers, polymerization initiator, solvent and the like are preferable to be used after the reaction obstructing substances such as water, oxygen, carbon dioxide, protonic compound and the like are previously removed.

The telechelic polymer(s) used in the methods described herein can be described as a polymer of structure X—P—Y where X and Y are functional groups that reduce hysteresis in a filled rubber compound compared to a non-functional polymer in the same filled rubber compound and P represents the polymer chain. More specifically, the functional substituents include those groups that reduce the 50° C. hysteresis loss of carbon-black filled vulcanizates prepared from polymers containing the functional group as compared to similar carbon-black filled vulcanizates prepared from a similar polymer that does not include the functional group. This advantageous reduction in hysteresis loss may be at least 5%, in other embodiments at least 10%, and in other embodiments at least 15%. In certain embodiments, this reduction in the 50° C. hysteresis loss occurs within carbon black filled vulcanizates, in other embodiments the reduction occurs within silica-filled vulcanizates, and in other embodiments the reduction occurs in vulcanizates that include a blend of silica and carbon black as filler. Examples of the X and Y functional groups are those described above in the sections relating to functional initiators and functional terminators. Preferred examples of X and Y include hexamethyleneimine (HMI) and tributyl tin.

As discussed above, in certain embodiments, the at least one telechelic polymer utilized has a cyclic amino alkyl functionality at its head and an $R_nMX_{4-n}$ functionality at its terminus where R is an organic group, M is silicon or tin, X is a halogen atom and n is a numeral from 0 to 3. In certain embodiments, the cyclic amino alkyl functionality contains hexamethyleneimine and the $R_nMX_{4-n}$ functionality is a tetrachloride tin compound. In other embodiments, the cyclic amino alkyl functionality meets Formula II:

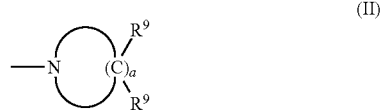

Where each $R^9$ is independently hydrogen or a hydrocarbyl group or where each $R^9$ join together to form a hydrocarbylene group (resulting in a bicyclic compound) and where a is an integer from 4-18. Specific examples of cyclic amino alkyl groups include, but are not limited to -pyrrolidine, -3-methylpyrrolidine, -34,4-dimethylpyrrolidine, -3,3-dimethylpyrrolidine, -piperidine, -4-methylpiperidine, -3-methylpiperidine, -morpholine, -4-methylpiperazine, -4-ethyl-piperazine, -4-propylpiperazine, -hexamethyleneimine (or -perhydroaxepine), -tri-methylperhydroazepine, -azacyclotridecane, azacyclohexadecane, -azacycloheptadeceden, -trimethylazabicyclooctaine, perhydroisoquinoline, and -perhydroindole.

Examples of terminating agents suitable for adding the $R_1MX_{4-n}$ terminator include tin tetrachloride, tributyl tin chloride, butyl tin trichloride, butyl silicon trichloride, as well as tetraethylorthosilicate (TEOS), $Si(OEt)_4$, and methyl triphenoxysilane, $MeSi(OPh)_3$. Other agents include the alkoxy silanes $Si(OR)_4$, $RSi(OR)_3$, $R_2Si(OR)_2$, cyclic siloxanes (such as hexamethylcyclotrisiloxane, including those disclosed in copending U.S. Publication No. 2007/0149744 A1, which is incorporated herein by reference), and, mixtures thereof. The organic moiety R is selected from the group consisting of alkyls having from 1 to 20 carbon atoms, cycloalkyls having from 3 to 20 carbon atoms, aryls having from 6 to 20 carbon atoms and aralkyls having from 7 to 20 carbon atoms. Typical alkyls include n-butyl, s-butyl, methyl, ethyl, isopropyl and the like. The cycloalkyls include cyclohexyl, menthyl and the like. The aryl and the aralkyl groups include phenyl, benzyl and the like.

In certain embodiments, the at least one filler utilized in the rubber composition is present in an amount of 5-100 phr. In other embodiments, the at least one filler is present in an amount of 10-90 phr. In yet other embodiments, the at least one filler is present in an amount of 15-80 phr or 25-75 phr. Various options for the at least one filler are well known to those of skill in the art. These options include, but are not limited to, carbon black, silica, alumina, aluminum hydroxide, clay, and magnesium hydroxide.

In one or more embodiments, silica (silicon dioxide) includes wet-process, hydrated silica produced by a chemical reaction in water, and precipitated as ultra-fine spherical particles. In one embodiment, the silica has a surface area of about 32 to about 400 m²/g, in another embodiment about 100 to about 250 m²/g, and in yet another embodiment, about 150 to about 220 m²/g. The pH of the silica filler in one embodiment is about 5.5 to about 7 and in another embodiment about 5.5 to about 6.8. Commercially available silicas include Hi-Sil™ 215, Hi-Sil™ 233, Hi-Sil™ 255LD, and Hi-Sil™ 190 (PPG Industries; Pittsburgh, Pa.), Zeosil™ 1165MP and 175GRPlus (Rhodia), Vulkasil™ (Bary AG), Ultrasil™ VN2, VN3 (Degussa), and HuberSil™ 8745 (Huber).

In one or more embodiments, the carbon black(s) may include any of the commonly available, commercially-produced carbon blacks. These include those having a surface area (EMSA) of at least 20 m²/gram and in other embodiments at least 35 m²/gram up to 200 m²/gram or higher. Surface area values include those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks that may be utilized include acetylene blacks. Mixtures of two or more of the above blacks can be used. Exemplary carbon blacks include those bearing ASTM designation (D-1765-82a) N-110, N-220, N-339, N-330, N-351, N-550, and N-660. In one or more embodiments, the carbon black may include oxidized carbon black.

As is well-known to those of skill in the art, a multitude of rubber curing agents may be employed. For example, sulfur or peroxide-based curing systems may be employed. Also, see Kirk-Othmer, ENCYCLOPEDIA OF CHEMICAL TECHNOLOGY, 3rd Edition, Wiley Interscience, New York 1982, Vol. 20, pp. 365-468, particularly VULCANIZATION AGENTS AND AUXILIARY MATERIALS pp. 390-402, or Vulcanization by A. Y. Coran, ENCYCLOPEDIA OF POLYMER SCIENCE AND ENGINEERING, 2nd Edition, John Wiley & Sons, Inc., 1989, which are incorporated herein by reference. Vulcanizing agents may be used alone or in combination. In one or more embodiments, the preparation of vulcanizable compositions and the construction and curing of the tire is not affected.

Other ingredients that may be employed are also well known to those of skill in the art and include accelerators, oils, waxes, scorch inhibiting agents, processing aids, zinc oxide, tackifying resins, reinforcing resins, fatty acids such as stearic acid, peptizers, and one or more additional rubbers. Examples of oils include paraffinic oils, aromatic oils, naphthenic oils, vegetable oils other than castor oils, and low PCA oils including MES, TDAE, SRAE, heavy naphthenic oils, and black oils.

In one or more embodiments, the vulcanizable rubber composition may be prepared by forming an initial masterbatch that includes the at least one telechelic polymer and filler. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called re-mills, can be employed between the masterbatch mix stage and the final mix stage. Various ingredients including polymers and copolymers can be added during these re-mills. Rubber compounding techniques and the additives employed therein are generally known as disclosed in The Compounding and Vulcanization of Rubber, in Rubber Technology (2nd Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the telechelic polymer(s) and/or copolymer(s) and fillers in the substantial absence of coupling and shielding agents. It is believed that this procedure will enhance the opportunity that a functional polymer will react or interact with silica before competing with coupling or shielding agents, which can be added later curing remills.

Figure 4:
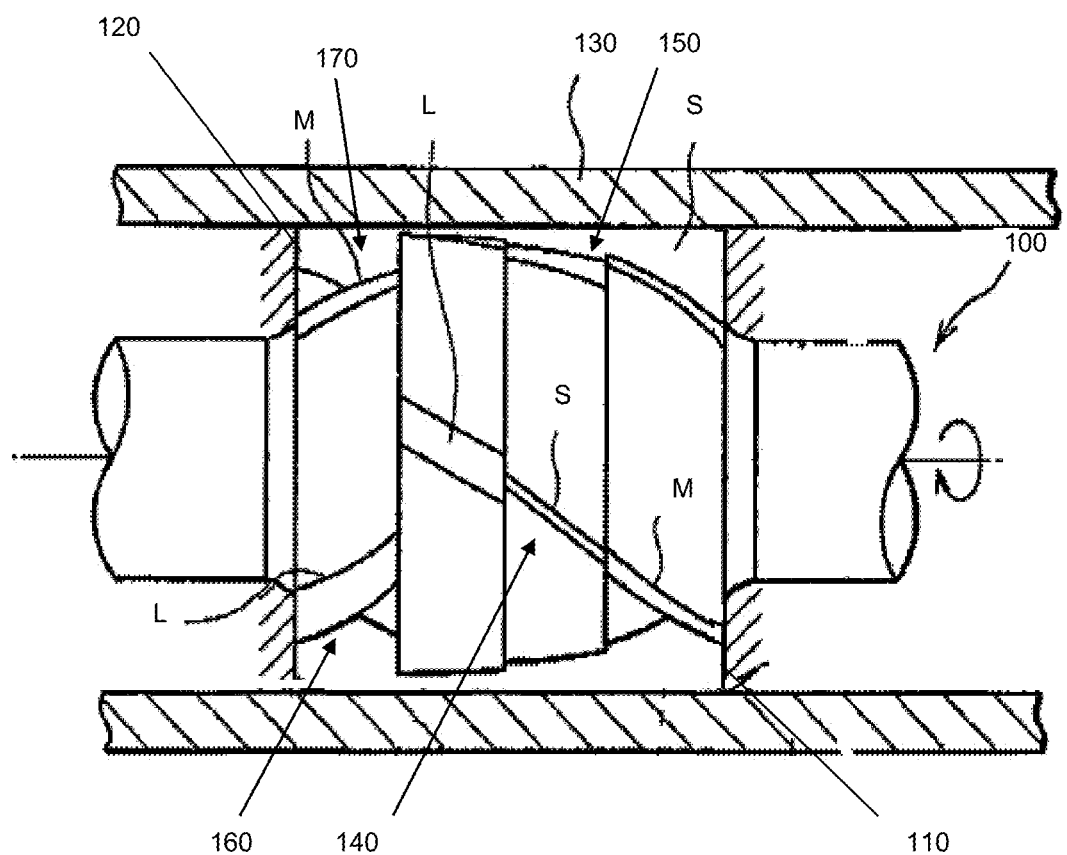
FIG. 4 illustrates a top view of a mixing rotor in a chamber.

In one or more embodiments, the compositions are mixed in a Banbury mixer using a rotor having at least six wings with variable clearance. FIG. 4 illustrates a top view of an exemplary mixing rotor 100 having a first end 110 and a second end 120. The mixing rotor is disposed in a chamber 130. Although only a single rotor is illustrated in a chamber, it should be understood that two or more rotors may be employed in a chamber.

Mixing rotor 100 includes three long wings 140 and 150 (a third long wing is hidden from view) that each extend from the first end 110 past a center point of the rotor 100. Each of the three long wings includes three segments, including a small tip portion S, a medium tip portion M, and a large tip portion L. In the illustrated embodiment, each of the three segments is of approximately equal length. In alternative embodiments (not shown), the segments have unequal lengths.

Each of small tip portion S, medium tip portion M, and large tip portion L have different clearances. In the illustrated embodiment, the small tip portion S has the highest tip, and therefore the smallest clearance. The large tip portion L has the lowest tip, and therefore the largest clearance. The medium tip portion M has a medium tip and medium clearance. However, it should be understood that the relative height of the tip need not correspond to the thickness of the wing portion. In one known embodiment, the ratio of tip clearance to the inner diameter of the chamber is 0.005 to 0.025 for the small tip portion S, 0.01 to 0.05 for the medium tip portion M, and 0.02 to 0.1 for the large tip portion L.

Mixing rotor 100 further includes three short wings 160 and 170 (the third short wing is hidden from view) that each extend from the second end 120 to the termination point of the long wings 140, 150. Each of the three short wings has a different clearance. In the illustrated embodiment, a first short wing 160 has a large tip portion with the lowest height and largest clearance. A second short wing 170 has a medium tip portion with a medium height and medium clearance. A third short wing (not shown) has a small tip portion with the greatest height and smallest clearance. In the illustrated embodiment, the large tip short wing has dimensions corresponding to the large tip portion of the long wing, the medium tip short wing has dimensions corresponding to the medium tip portion of the long wing, and the small tip short wing has dimensions corresponding to the small tip portion of the long wing. In alternative embodiments, the dimensions may vary. In one known embodiment, the ratio of tip clearance to the inner diameter of the chamber is 0.005 to 0.025 for the small tip short wing (not shown), 0.01 to 0.05 for the medium tip short wing 170, and 0.02 to 0.1 for the large tip short wing 160.

In one embodiment, the small tip portion S of the long wings and the small tip short wing are in close proximity to the inner wall surface of the chamber 130, such that they impart shearing force to the mixing materials to improve the dispersion efficiency when the mixing rotor 100 rotates, and scrapes off the surface layer of the mixing materials attached to the inner wall surface of the chamber 130 to improve the cooling efficiency to the mixing materials.

Additionally, in one embodiment, the large tip portion of the long wings and the large tip short wings are sufficiently remote from the inner wall surface of the chamber 130 to increase the amount of mixing materials passing through the tip clearance. The large clearance also may promote movement in the circumferential direction when the mixing rotor 100 rotates. It has been found that use of such a rotor produces an improved mixing efficiency such that the rubber composition reaches a temperature of at least 165° C. during a master batch stage at least 15% faster than the same rubber composition mixed using a 4S or 4H mixer.

Figure 5:
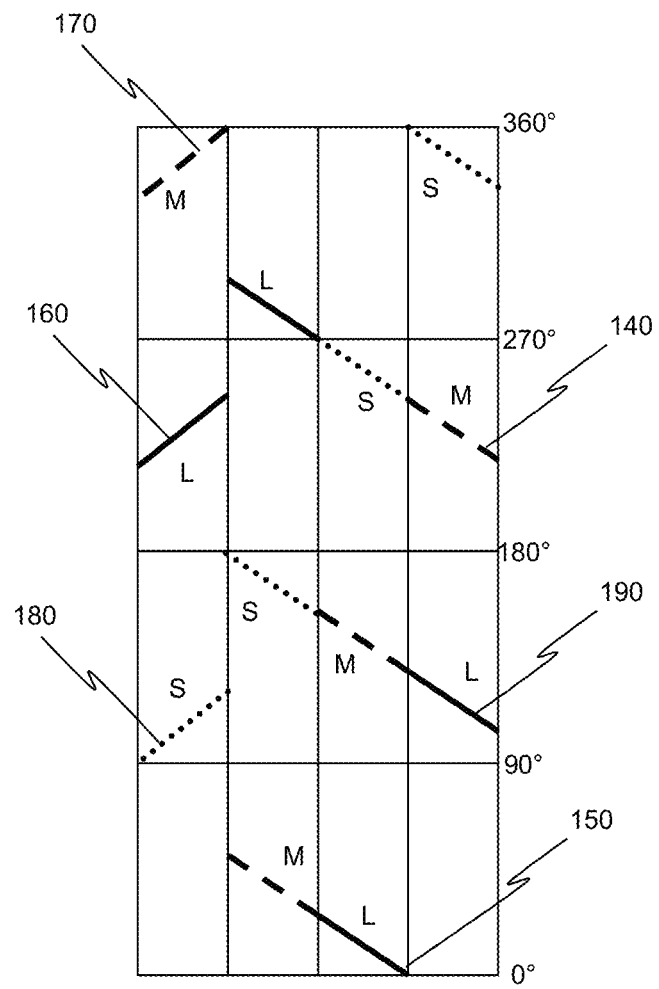
FIG. 5 illustrates a development view of mixing rotor.

FIG. 5 illustrates a development view of mixing rotor as it turns from 0° to 360°. Vertical lines show the termination of the short wings, and the dividing lines of the segments of the long wings. As can be seen in this view, first short wing 160 has a large tip portion, second short wing 170 has a medium tip, and third short wing 180 has a small tip portion. Additionally, first long wing 150 has a large tip segment nearest the short wings, then a small tip portion, followed by a medium tip portion. Second long wing 150 has a medium tip segment nearest the short wings, then a large tip portion, then a small tip portion. Third long wing 190 has a small tip portion nearest the short wings, then a medium tip portion, then a large tip portion. However, it should be understood that this layout is merely exemplary, and that the order of the portions may be varied.

Figure 2:
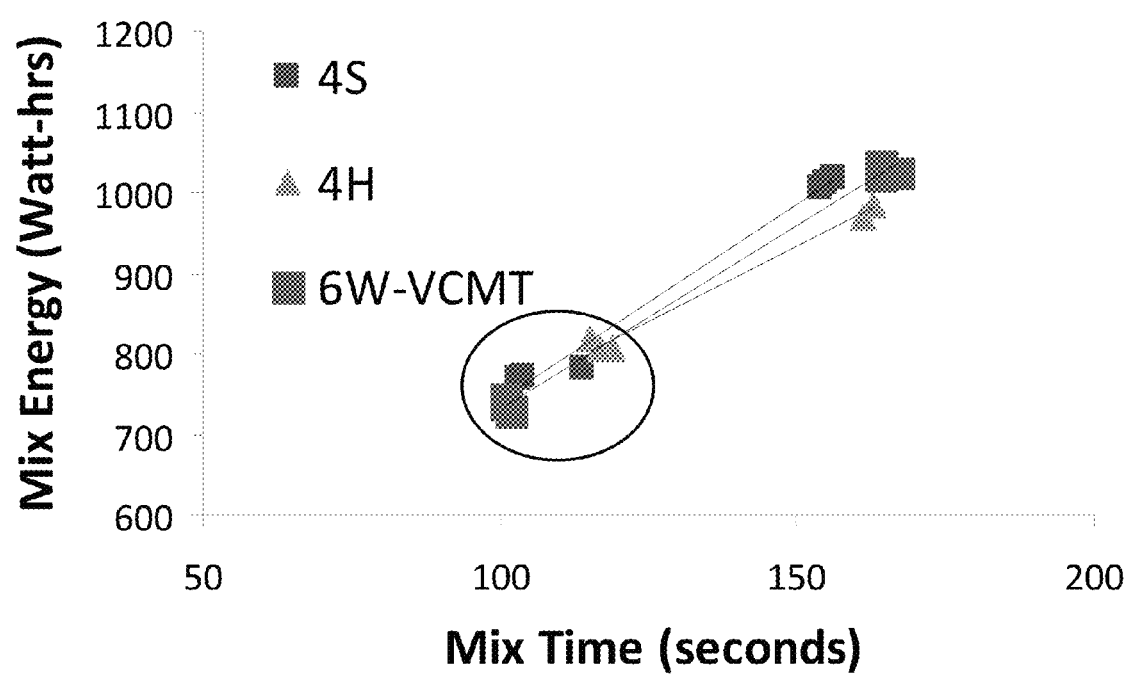
FIG. 2 is a graph of mixing energy versus mixing time for control polymer 1.

Although FIG. 2 shows each long wing as having a small tip portion, a medium tip portion, and a large tip portion, this is not required. In alternative embodiments (not shown), one or more of the long wings may two small tip portions and a large tip portion, two large tip portions and a medium tip portion, or any combination of small, medium, and large tip portions.

While a six wing rotor is shown and described, it should be understood that other variable clearance rotors may be employed. In alternative embodiments (not shown), rotors having eight, ten, or twelve wings may be employed. In such embodiments, the number of short wings is equal to the number of long wings. In other alternative embodiments (not shown), the rotors may have an unequal number of short and long wings. Such embodiments may result in an odd number of wings.

Additionally, while long wings having three segments are shown and described, it should be understood that additional segments with different clearances may be employed. For example, four, five, or six different segments may be employed. In one specific example (not shown), an eight-wing rotor includes four short wings and four long wings, with each long wing having four segments of different clearances.

Where the rubber compositions are employed in the manufacture of tires, these compositions can be processed into tire components according to ordinary tire manufacturing techniques including standard rubber shaping, molding and curing techniques. Any of the various rubber tire components can be fabricated including, but not limited to, treads, sidewalls, belt skims, and carcass. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

This application discloses several numerical range limitations that support any range within the disclosed numerical ranges even though a precise range limitation is not stated verbatim in the specification because the embodiments could be practiced throughout the disclosed numerical ranges. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references, including but not limited to patents, patent applications, and non-patent literature are hereby incorporated by reference herein in their entirety.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

EXAMPLES

Mooney viscosity (ML1+4) values are determined with an Alpha Technologies Mooney viscometer (with a large rotor) The sample is preheated at 130° C. for 1 minute before the rotor starts. The Mooney Viscosity measurement is recorded as the torque after the rotor has rotated 4 minutes at 130° C. Dispersion index was measured by using a Surfanalyzer according to ASTM D 2663-95a, part C. Bound rubber was determined by solvent extraction with toluene at room temperature. More specifically, a test specimen of each uncured rubber formulation was placed in toluene for three days. The solvent was removed and the residue was dried and weighed. The percentage of bound rubber was then determined according to the formula % bound rubber=$(100(W_d-F))/R$ where $W_d$ is the weight of the dried residue, F is the weight of the filler and any other solvent insoluble matter in the original sample, and R is the weight of the rubber in the original sample.

Three SBR polymers were utilized to prepare various rubber compounds. The three SBR polymers had the properties provided below in Table 1. As indicated in Table 1, the first two SBR polymers were used as controls (not being telechelic polymers) and the third SBR polymer was a telechelic polymer. The formulation used to prepare the rubber compositions is provided below in Table 2.

TABLE 1

|  | Control 1 | Control 2 | Telechelic Polymer |
| --- | --- | --- | --- |
| Initiator | BuLi | BuLi | Li-HMI |
| Terminator | IPA | SnCl$_4$ | SnCl$_4$ |
| Mn (kg/mol) | 149 | 212 | 254 |
| Mw (kg/mol) | 158 | 309 | 339 |
| % Styrene | 25 | 25 | 26 |
| % Vinyl (BD = 100%) | 41 | 41 | 43 |
| ML 1 + 4 (100° C.) | 54 | 95 | 90 |

TABLE 2

| Ingredient | Amount (phr) |
| --- | --- |
| Master Batch | |
| SBR | 70 |
| Natural Rubber | 30 |
| Oil | 10.5 |
| Carbon Black (N326) | 41 |

TABLE 2-continued

| Ingredient | Amount (phr) |
|---|---|
| 6PPD | 0.95 |
| Wax | 1 |
| Stearic Acid | 2 |
| Final Batch | |
| Sulfur | 1.3 |
| DPG | 0.2 |
| CBS | 1.7 |

The SBR polymers (listed in Table 1) were mixed for purposes of a master batch in an 18 L Banbury mixer using one of: (a) a traditional 4 wing S configuration rotor (4WS), (b) a traditional 4 wing H configuration rotor (4WH), (c) a traditional 4 wing N configuration rotor (4WN) or (d) a 6 wing rotor configuration according to the disclosure herein (6WVCMT). The 6 wing rotor configuration according to the disclosure was from Kobelco (KBSI), with the rotor designated 6-Wing VCMT Tangential. One of two conditions was used to determine when to discharge the batch: (1) reaching a temperature of approximately 165° C. in the batch or (2) 165 seconds of mixing. Three replicates of each condition were performed.

When discharging the batch at approximately 165° C., the combination of the 6WVCMT rotor and telechelic polymer gave the shortest cycle time. This combination was on average 19.1% faster (to reach approximately 165° C.) than using the 4WH. For comparison, the 6WVCMT rotor was only on average 13.4% faster with control 1 and on average 14.7% faster with control 2. Coupled with the faster cycle time was a greater improvement in dispersion index compared to the 4WH rotor when combining the telechelic polymer with the 6WVCMT rotor. Results are reported in Table 3 below.

TABLE 3

| | Control 1 | | | Control 2 | | | Telechelic Polymer | | |
|---|---|---|---|---|---|---|---|---|---|
| | 1 | 2 | 3 | 1 | 2 | 3 | 1 | 2 | 3 |
| Mixing time to reach 165° C. VCMT (seconds) | 101 | 101 | 102 | 97 | 95 | 103 | 93 | 93 | 97 |
| Mixing time to reach 165° C. 4WH (seconds) | 115 | 119 | 117 | 115 | 115 | 116 | 113 | 118 | 119 |
| Mixing time to reach 165° C. 4WS (seconds) | 103 | 104 | 114 | 101 | 108 | 107 | 102 | 102 | 104 |
| Mixing time to reach 165° C. 4WN (seconds) | 125 | 119 | 123 | 123 | 119 | 119 | 126 | 126 | 127 |

Figure 3:
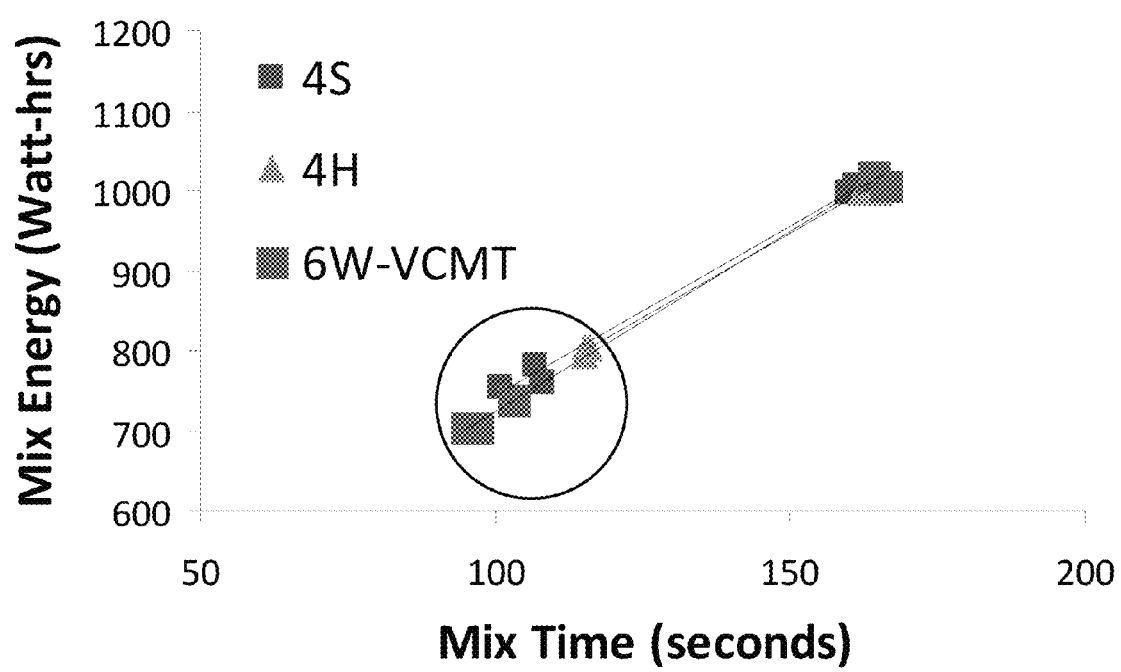
FIG. 3 is a graph of mixing energy versus mixing time for control polymer 2.

As well as the faster cycle time that was achieved using the combination of 6WVCMT rotor and telechelic polymer, this combination gave a greater improvement in dispersion index compared to the 4WH rotor. For example, the telechelic polymer with 6WVCMT rotor gave on average an 82% better dispersion than the 4WH rotor, on average 17% better dispersion for the first control and on average 9% better dispersion for the second control when mixed at constant discharge temperature. Along with an improvement in dispersion, use of the 6WVCMT rotor improved bound rubber. Also notable is the reduction in mix energy required to cause the batch to reach constant discharge temperature of about 165° C. Notably, for the telechelic polymer, the mix energy required to reach about 165° C. using the 6WVCMT rotor was 11.6% than using the 4S, 18.2% less than using the 4N and 8.6% less than using the 4H. Results are reported in Table 4 below (where the polymer used in both batch 2 and batch 5 replicates was the HMI-Li telechelic polymer disclosed above in Table 1). A graphical representation of mixing energy versus mixing time is provided in FIGS. 1, 2 and 3 (with data points within the circle being for mixing that was discharged when the batch reached about 165° C.). All data reported in Tables 3 and 4 is for mixing through the master batch stage only.

TABLE 4

|  | Constant Drop Temperature | | | | Constant Drop Time | | | |
|---|---|---|---|---|---|---|---|---|
|  | Rotor Type: | | | | | | | |
|  | 6W-VCMT | 4H | 4N | 4S | 6W-VCMT | 4H | 4N | 4S |
| Batch Number: | 2 | 2 | 2 | 2 | 5 | 5 | 5 | 5 |
| Drop Temperature (° C.): | 162.0 | 163.3 | 167.7 | 165.2 | 187.7 | 182.8 | 180.6 | 184.6 |
| Drop Time (s): | 93 | 118 | 126 | 102 | 165 | 165 | 164 | 161 |
| Mix Energy (Watt-hr) | 713 | 807 | 872 | 780 | 1089 | 1018 | 1021 | 1073 |
| ML1 + 4 @ 130° C.: | 51.3 | 49.7 | 52.7 | 52.2 | 49.2 | 48.7 | 51.9 | 51.9 |
| Bound Rubber (%): | 35.5 | 35.5 | 35.1 | 34.1 | 40.1 | 39.6 | 38.4 | 42.3 |
| Surfanalyzer Dispersion (%): | 63.8 | 60.1 | 48.4 | 48.5 | 67.1 | 62.2 | 57.4 | 63.1 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for preparing a rubber composition, the method comprising:
   (a) providing a mixer having a mixing chamber and at least one rotor,
      wherein the at least one rotor includes three long wings that have origins at a first end of a mixing section of the rotor and terminate beyond a center point of the mixing section of the at least one rotor,
      wherein each long wing has three segments, including a first segment having a first clearance to the mixing chamber, a second segment having a second clearance to the mixing chamber different from the first clearance, and a third segment having a third clearance to the mixing chamber different from the first clearance and different from the second clearance,
      wherein the rotor further includes three short wings that have origins at a second end of the mixing section of the rotor and terminate before the center point of the mixing section of the rotor, and
      wherein the three short wings include a first short wing having the first clearance, a second short wing having the second clearance, and a third short wing having the third clearance;
   (b) adding to the mixing chamber, ingredients comprising:
      at least one filler, and
      at least one telechelic polymer having a cyclic amino alkyl functionality at its head and an $R_nMX_{4-n}$ functionality at its terminus where R is an organic group, M is silicon or tin, X is a halogen atom, and n is a numeral from 0 to 3; and
   (c) using the mixer to mix the ingredients in at least one of a master batch stage, re-mill stage and final mixing stage to produce a rubber composition having an improved dispersion index after master batch mixing that is at least 30% higher than the dispersion index of the same rubber composition mixed using a 4S or 4H mixer,
   wherein, the method produces an improved mixing efficiency such that the rubber composition reaches a temperature of at least 165° C. during the master batch stage at least 15% faster than the same rubber composition mixed using a 4S or 4H mixer.

2. The method of claim 1, wherein the at least one telechelic polymer is a polymer or copolymer containing conjugated diene monomer and optionally vinyl aromatic monomer.

3. The method of claim 1, wherein the at least one telechelic polymer has a Tg between −80 and 0° C.

4. The method of claim 1, wherein the at least one filler is present in an amount from 5 to 100 phr and is selected from the group consisting of carbon black, silica, alumina, aluminum hydroxide, clay, and magnesium hydroxide and combinations thereof.

5. The method of claim 1, wherein the cyclic amino alkyl functionality contains hexamethyleneimine and the $R_nMX_{4-n}$ is a tetrachloride tin compound.

6. The method of claim 1, wherein the at least one rotor consists of a first rotor and a second rotor.

7. A method for preparing a rubber composition, utilizing a mixer, the method comprising:
   (a) providing a mixer having a rotor and a mixing chamber, wherein the rotor has 2x wings, where x is a number between three and six, including x long wings that have origins at a first end of a mixing section of the rotor and terminate beyond a center point of the mixing section of the rotor, and further including x short wings that have origins at a second end of the mixing section of the rotor and terminate before a center point of the mixing section of the rotor, wherein the x short wings include a first short wing having a first clearance to the mixing chamber, a second short wing having a second clearance to the mixing chamber different from the first clearance, and a third short wing having a third clearance to the mixing chamber different from the first clearance and different from the second clearance, and wherein each of the x long wings has at least three segments, including a first segment having a fourth clearance to the mixing chamber, a second segment having a fifth clearance to the mixing chamber different from the fourth clearance, and a third segment having a sixth clearance to the mixing chamber different from the fourth clearance and different from the fifth clearance;

(b) adding to the mixing chamber, ingredients comprising:
at least one filler, and
at least one telechelic polymer; and (c) using the mixer to mix the ingredients in at least one of a master batch stage, re-mill stage and final mixing stage to produce a rubber composition having an improved dispersion index after master batch mixing that is at least 30% higher than the dispersion index of the same rubber composition mixed using a 4S or 4H mixer, wherein, the method produces an improved mixing efficiency such that the rubber composition reaches a temperature of at least 165° C. during the master batch stage at least 15% faster than the same rubber composition mixed using a 4S or 4H mixer.

8. The method of claim 7, wherein the at least one telechelic polymer is a polymer or copolymer containing conjugated diene monomer and optionally vinyl aromatic monomer.

9. The method of claim 7, wherein the at least one telechelic polymer has a Tg between −80 and 0° C.

10. The method of claim 7, wherein the at least one filler is present in an amount of 5 to 100 phr and is selected from the group consisting of carbon black, silica, alumina, aluminum hydroxide, clay, and magnesium hydroxide and combinations thereof 11. The method of claim 7, wherein the at least one telechelic polymer has a cyclic amino alkyl functionality at its head and an $R_nMX_{4-n}$ functionality as its terminus where R is an organic group, M is silicon or tin, X is a halogen atom, and n is a numeral from 0 to 3.

12. The method of claim 11, wherein the cyclic amino alkyl functionality contains hexamethyleneimine and the $R_nMX_{4-n}$ is a tetrachloride tin compound.

13. The method of claim 7, wherein each of the x short wings further includes a fourth short wing having a seventh clearance to the mixing chamber different from the first, second, and third clearance, and wherein the x long wings further includes a fourth segment having an eighth clearance to the mixing chamber different from the fourth, fifth, and sixth clearance.

14. The method of claim 13, wherein each of the x short wings further includes a fifth short wing having a ninth clearance to the mixing chamber different from the first, second, third, and seventh clearance, and wherein the x long wings further includes a fifth segment having a tenth clearance to the mixing chamber different from the fourth, fifth, sixth, and eighth clearance.

15. The method of claim 14, wherein each of the x short wings further includes a sixth short wing having an eleventh clearance to the mixing chamber different from the first, second, third, seventh, and ninth clearance, and wherein the x long wings further includes a sixth segment having a twelfth clearance to the mixing chamber different from the fourth, fifth, sixth, eighth, and tenth clearance.

16. The method of claim 7, wherein the first clearance is equal to the fourth clearance, the second clearance is equal to the fifth clearance, and the third clearance is equal to the sixth clearance.

17. A method of making a rubber composition-containing tire tread comprising:

(a) providing a mixer having a rotor and a mixing chamber, wherein the rotor has 2x wings, where x is a number between three and six, including x long wings and x short wings, wherein each of the short wings has a clearance to the mixing chamber that is different from the clearance of the other short wings, and wherein each of the longs wings has a plurality of segments, each segment having a clearance to the mixing chamber that is different from the clearance of the other segments;

(b) adding to the mixing chamber, ingredients comprising:
at least one filler, and
at least one telechelic polymer; and (c) using the mixer to mix the ingredients in at least one of a master batch stage, re-mill stage and final mixing stage to produce a rubber composition; and incorporating the rubber composition into a tire tread, wherein the resulting tread has improved rolling resistance versus a tire tread having substantially the same pattern, made from a rubber composition of the same ingredients, mixed using a mixer having a 4 wing H rotor or a 4 wing S rotor.

18. The method of claim 17 wherein the rubber composition, after master batch mixing but prior to incorporating into the tire tread, has an improved dispersion index after master batch mixing that is at least 30% higher than the dispersion index of the same rubber composition mixed using a 4S or 4H mixer.

19. The method of claim 17 wherein the method produces an improved mixing efficiency such that the rubber composition reaches a temperature of at least 165° C. during the master batch stage at least 15% faster than the same rubber composition mixed using a 4S or 4H mixer 20. The method of claim 17, wherein the at least one telechelic polymer is a polymer or copolymer containing conjugated diene monomer and optionally vinyl aromatic monomer.

21. The method of claim 17, wherein the at least one telechelic polymer has a Tg between −80 and 0° C.

22. The method of claim 17, wherein the at least one filler is present in an amount of 5 to 100 phr and is selected from the group consisting of carbon black, silica, alumina, aluminum hydroxide, clay, and magnesium hydroxide, and combinations thereof.

23. The method of claim 17, wherein the at least one telechelic polymer has a cyclic amino alkyl functionality at its head and an $R_nMX_{4-n}$ functionality as its terminus where R is an organic group, M is silicon or tin, X is a halogen atom, and n is a numeral from 0 to 3.

24. The method of claim 23, wherein the cyclic amino alkyl functionality contains hexamethyleneimine and the $R_nMX_{4-n}$ is a tetrachloride tin compound.

25. The method of claim 17 wherein: (a) the rotor has three long wings and three short wings, (b) the rubber composition, after master batch mixing but prior to incorporating into the tire tread, has an improved dispersion index after master batch mixing that is at least 30% higher than the dispersion index of the same rubber composition mixed using a 4S or 4H mixer and (c) the method produces an improved mixing efficiency such that the rubber composition reaches a temperature of at least 165° C. during the master batch stage at least 15% faster than the same rubber composition mixed using a 4S or 4H mixer.

* * * * *